United States Patent
Umeda et al.

(10) Patent No.: US 6,231,110 B1
(45) Date of Patent: May 15, 2001

(54) HOOD STRUCTURE

(75) Inventors: Shungo Umeda; Tatsuya Ohara; Michio Tamura, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/504,581

(22) Filed: Feb. 15, 2000

(30) Foreign Application Priority Data

Feb. 19, 1999 (JP) .................................................. 11-042397

(51) Int. Cl.⁷ ........................................................ B60J 7/00
(52) U.S. Cl. .................................. 296/146.14; 296/107.07
(58) Field of Search ........................ 296/146.14, 107.07, 296/145

(56) References Cited

U.S. PATENT DOCUMENTS

| | | | |
|---|---|---|---|
| 3,091,494 | * | 5/1963 | Cohen . |
| 4,799,727 | * | 1/1989 | Robbins et al. ...................... 296/107 |
| 5,015,028 | * | 5/1991 | Bonnett ................................ 296/107 |
| 5,050,663 | * | 9/1991 | Rhoads et al. ..................... 160/231.2 |
| 5,454,615 | * | 10/1995 | Schnepf ............................... 296/95.1 |
| 5,558,390 | * | 9/1996 | Hemmis et al. ................. 296/146.14 |
| 6,082,807 | * | 7/2000 | Hartmann et al. .............. 296/107.07 |

* cited by examiner

Primary Examiner—Joseph D. Pape
(74) Attorney, Agent, or Firm—Sughrue, Mion, Zinn, Macpeak & Seas, PLLC

(57) ABSTRACT

A rear window is provided as a curved window, curved with an arc-like shape in the car width direction, with flexible frames disposed parallel along the upper side and the lower side of the curved window, mounted to a convertible top or hood. The flexible frames regain the straight shape at the time of folding the rear window so as to eliminate the curvature of the rear window in the car width direction as well as a linear fold can be formed in this direction without forming disadvantageous folds.

7 Claims, 8 Drawing Sheets

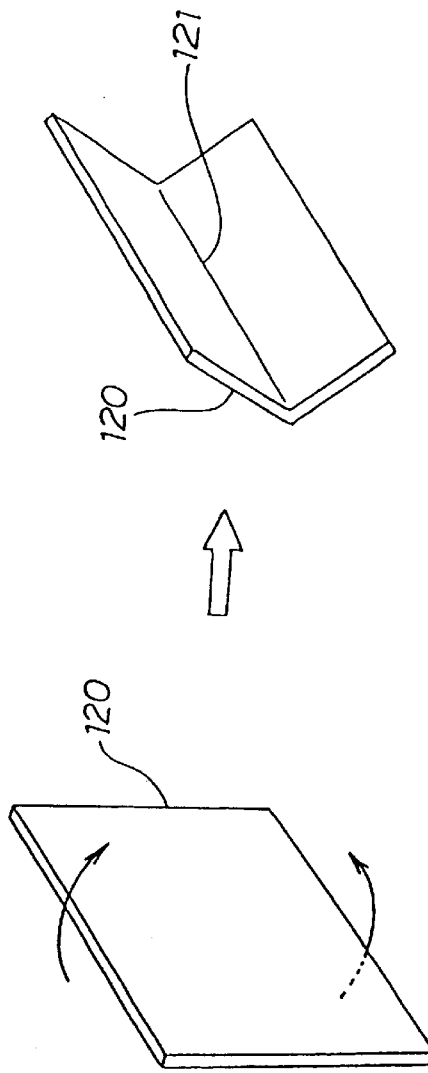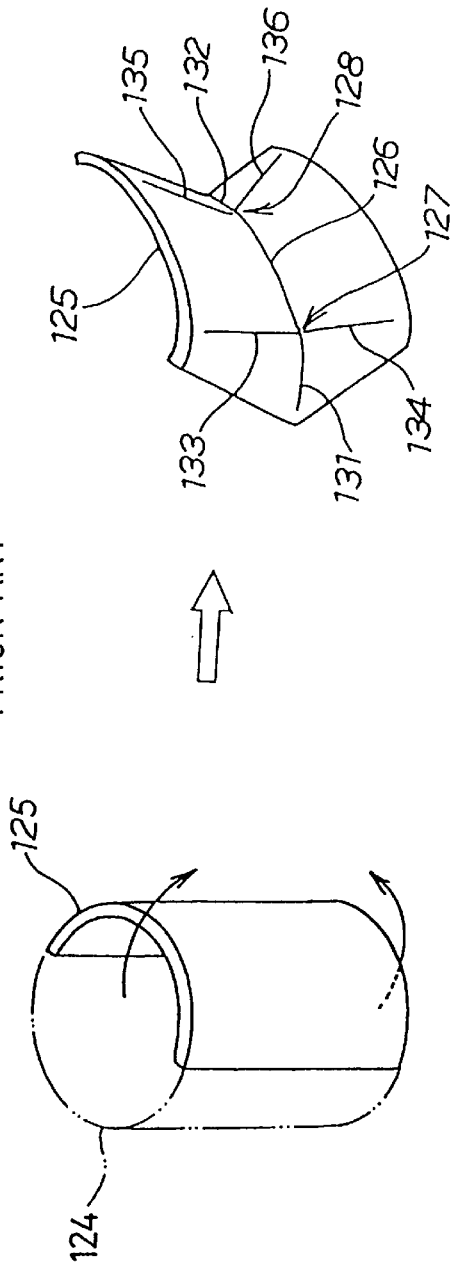

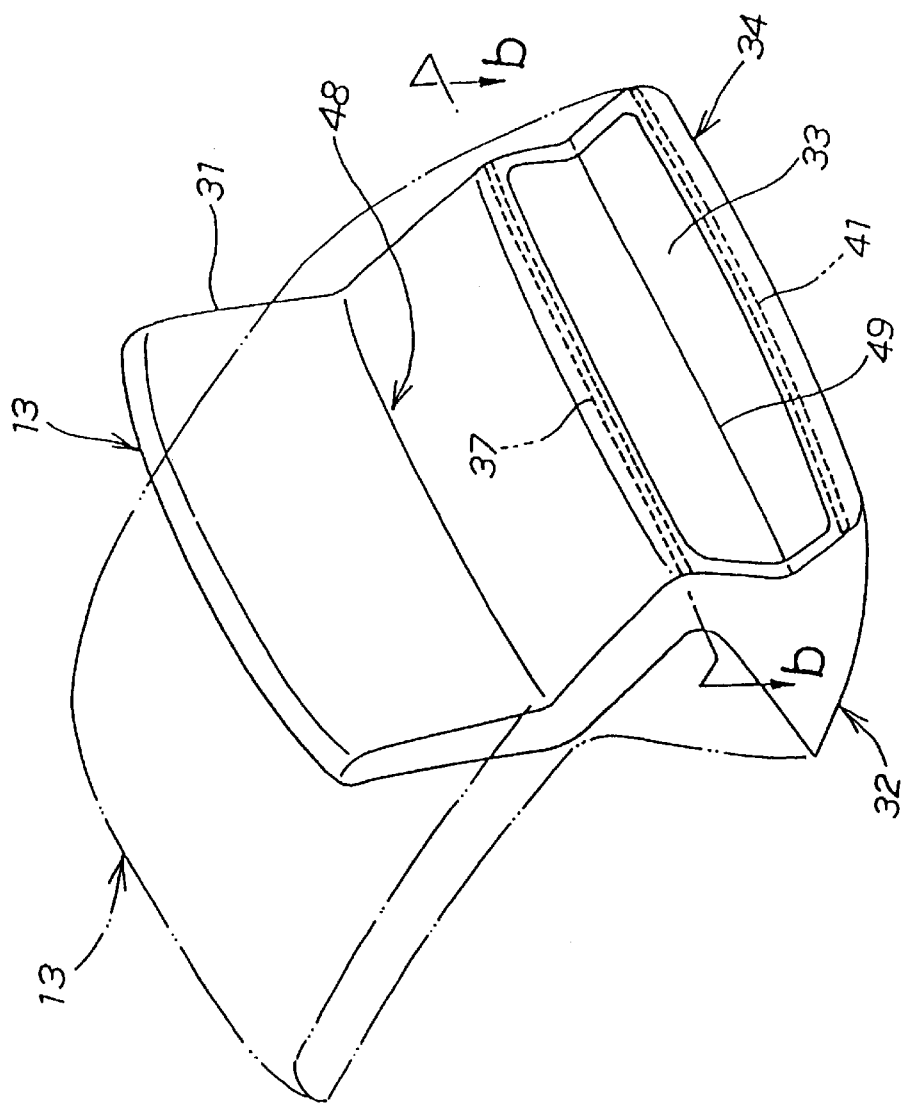
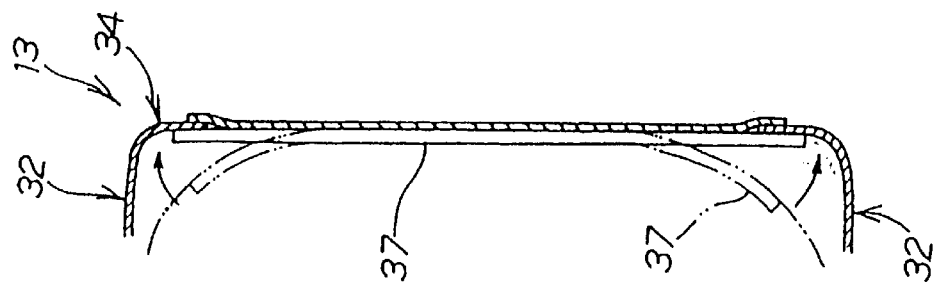

HOOD STRUCTURE

BACKGROUND OF THE INVENTION

1. Field of the Invention

The present invention relates to a hood structure preferable for smoothly folding a rear window of a foldable hood of a convertible car.

2. Description of the Related Art

Convertible cars comprise a foldable hood for coping with the rainy weather. The hood will be explained hereinafter.

FIGS. 7A to 7C are diagrams for explaining the state of folding a conventional hood.

In FIG. 7A, the imaginary line denotes the state of a hood 101 of a convertible car 100 expanded for use.

The hood 101 comprises an upper part 102, a side part 103, and a rear part 105 provided with a resin rear window 104, with a plurality of links (not shown) disposed in the inside so as to be folded in a certain shape for storage. Numeral 106 denotes a front window, and 107 a car body.

The hood 101 has the front end of the upper part 102 interlocked with the front window 106, and the lower ends of the side part 103 and the rear part 105 mounted on the car body 107, respectively. The rear part 105 is a curved surface projected backward so as to have an arc-like shape in the car width direction, connected with the upper part 102 and the side part 103 smoothly. The rear window 104 forms a part of the curved surface.

In storing the hood 101, first, the upper part 102 is bent at a bending part 108 by disconnecting the interlock of the upper part 102 of the hood 101 and the front window 106, and moving the upper part 102 to the rear upper direction.

Next, the side part 103 is folded and pulled down as well as the rear window 104 is bent at a bending part 111.

In FIG. 7B, the upper part 102, the side part 103 and the rear part 105 are further pulled down backward for folding, so as to be stored in the car body 107 as shown in FIG. 7C.

FIG. 8 is a perspective view of the hood of FIG. 7B. In bending vertically the rear window 104, which has been curved, projecting backward so as to have an arc-like shape in the car width direction before folding, a fold 112 is formed at the bending part 111, and further, folds 113 to 116 elongating from the fold 112 in the substantially vertical direction are formed.

In the case opening and closing of the hood 101 is repeated, there is a risk that particularly the intersections 117, 118 of the folds 112 to 116 are stretched so that some parts of the rear window 104 may not be fully opened at the time of spreading the hood 101.

SUMMARY OF THE INVENTION

In view of the above, an object of the invention is to provide a hood structure capable of maintaining a rear window in a flat state at the time of spreading the hood.

In order to achieve the object, according to the invention, there is provided a hood structure comprising a foldable hood of a convertible car provided with a rear window to be folded at the time of folding the hood, wherein the rear window is a curved window having a substantially rectangular shape, curved with an arc-like shape in the car width direction, with flexible frames disposed parallel along the upper side and the lower side of the curved window, mounted to the hood.

In folding the rear window, tension of the hood caused by the links and crosspieces (not illustrated) can be eliminated so that the flexible frames regain the straight shape for eliminating the curvature of the rear window in the car width direction.

Accordingly, the hood can be folded at the linear fold substantially parallel to the upper side and the lower side entirely in the car width direction of the rear window.

BRIEF DESCRIPTION OF THE DRAWINGS

FIGS. 5A and 5B are diagrams for explaining the folding operation of the rear window;

FIGS. 6A and 6B are diagrams for explaining the effects of the hood structure according to the invention;

DETAILED DESCRIPTION OF THE PREFERRED EMBODIMENTS

Hereinafter, an embodiment of the invention will be explained with reference to the accompanied drawings. The figures are to be viewed from the direction of the numerals.

Figure 1:
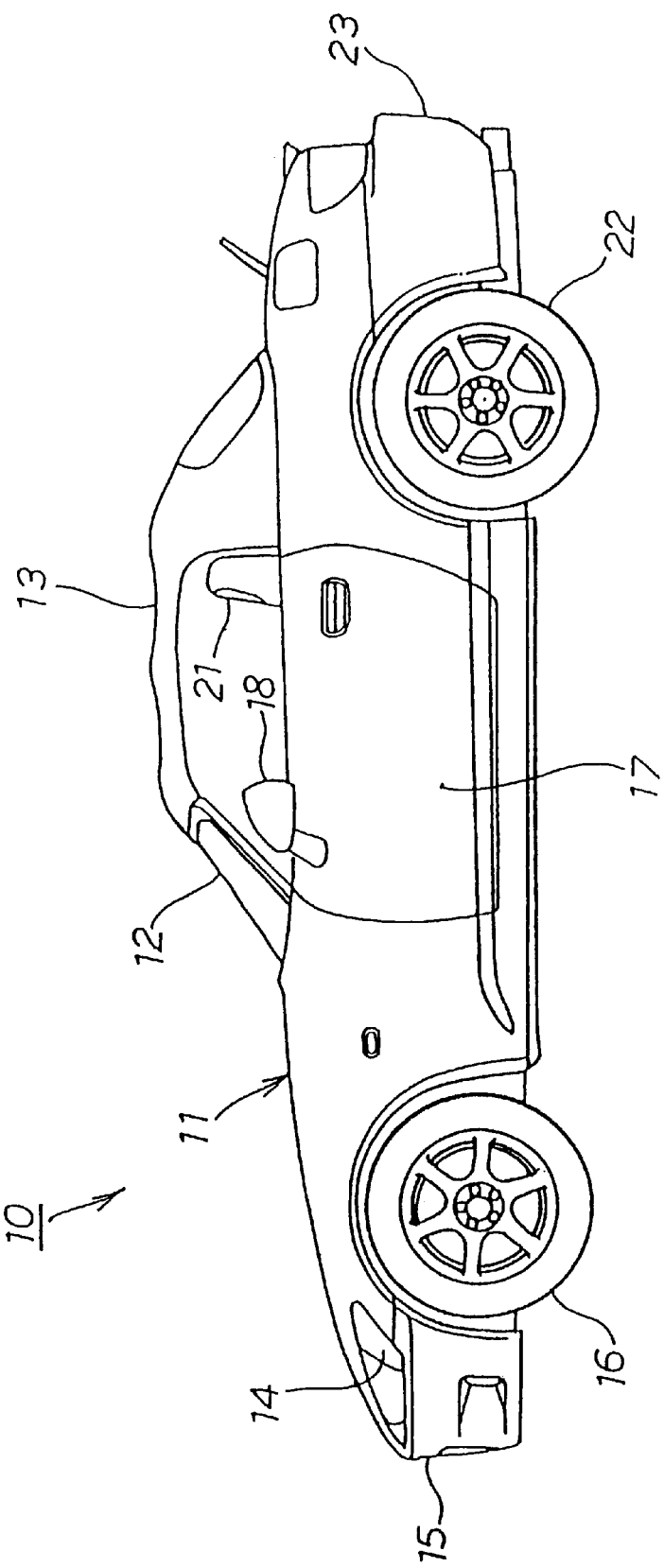
FIG. 1 is a side view of a convertible car adopted with a hood structure according to the invention.

FIG. 1 is a side view of a convertible car equipped with a hood structure according to the invention. A convertible car 10 comprises a car body 11, a front window 12 provided in the upper forward part of the car body 11, and a hood or top 13 capable of forming a car passenger compartment by covering from the rear part of the car body 11 to the upper end of the front window 12. Numeral 14 denotes a head lamp; 15, a front bumper; 16, a front wheel; 17, a door; 18, a mirror; 21, a seat; 22, a rear wheel; and 23, a rear bumper.

Figure 2:
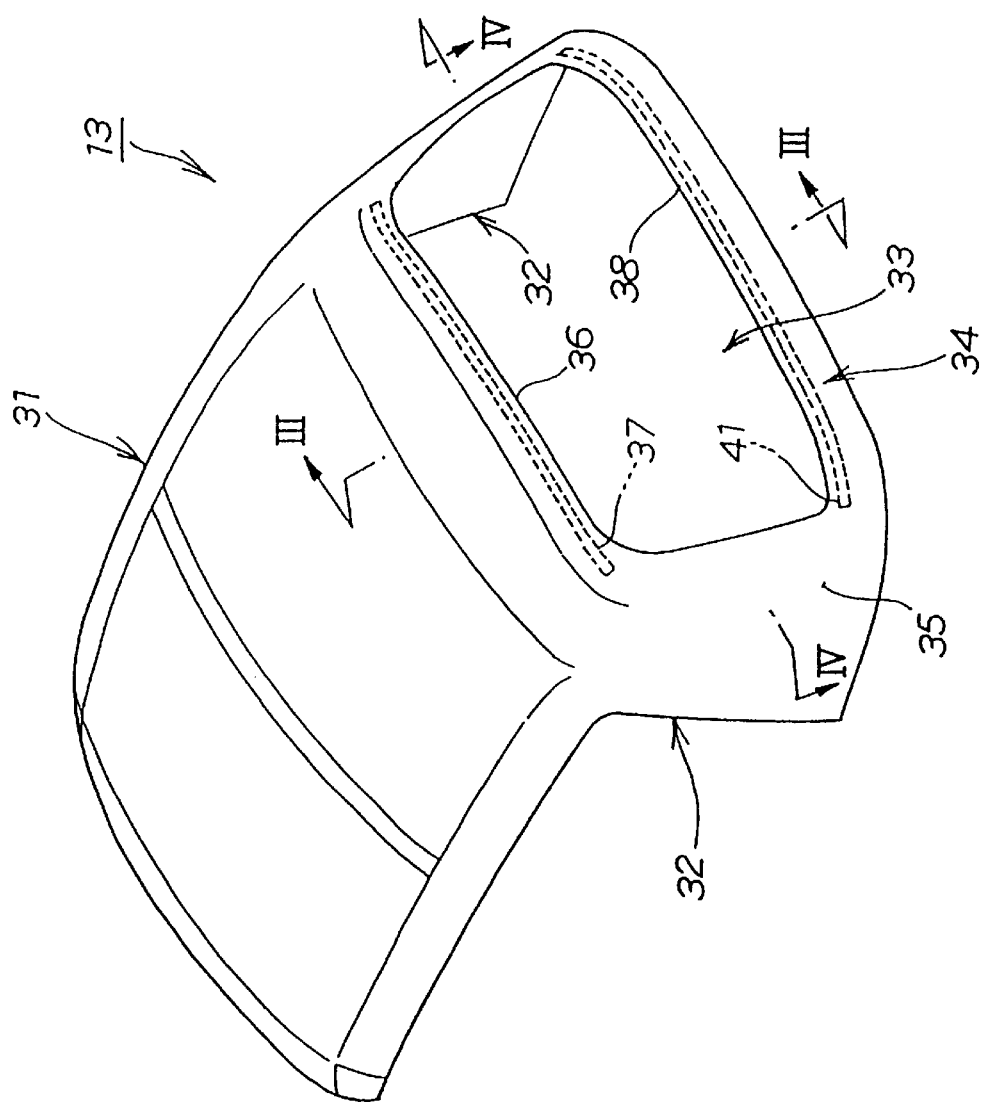
FIG. 2 is a perspective view of the hood according to the invention.

FIG. 2 is a perspective view of the hood according to the invention. The hood 13 comprises a ceiling part 31, side parts 32, 32, and a rear part 34 provided with a substantially rectangular rear window 33. In the ceiling part 31, there are provided a plurality of crosspieces (not shown), and from the side parts 32, 32 to the ceiling part 31 side part, there are provided a plurality of links (not shown) for having a predetermined folding shape in folding the hood 13.

The rear window 33 is a transparent soft resin member. Further, the surface material 35 other than the rear window 33 part is a member comprising a fabric with a soft resin attached on the surface side thereof for improving the durability in bending.

In the rear part 34, a flexible upper frame member 37 as a flexible frame is mounted in the vicinity of the upper side 36 of the rear window 33 and, more specifically, at a position parallel to and above the upper side 36 on the rear surface. Further, a flexible lower frame member 41 as a flexible member is mounted in the vicinity of the lower side 38 and, more specifically, at a position parallel to and below the lower side 38 on the rear surface.

The upper and lower frame members 37, 41 have a straight shape in the state without setting up the hood 13.

The length of the upper and lower frame members 37, 41 is the same as the width of the rear window 33, or in the range more than the width of the rear window 33 and not exceeding the maximum width of the hood 13.

Figure 3:
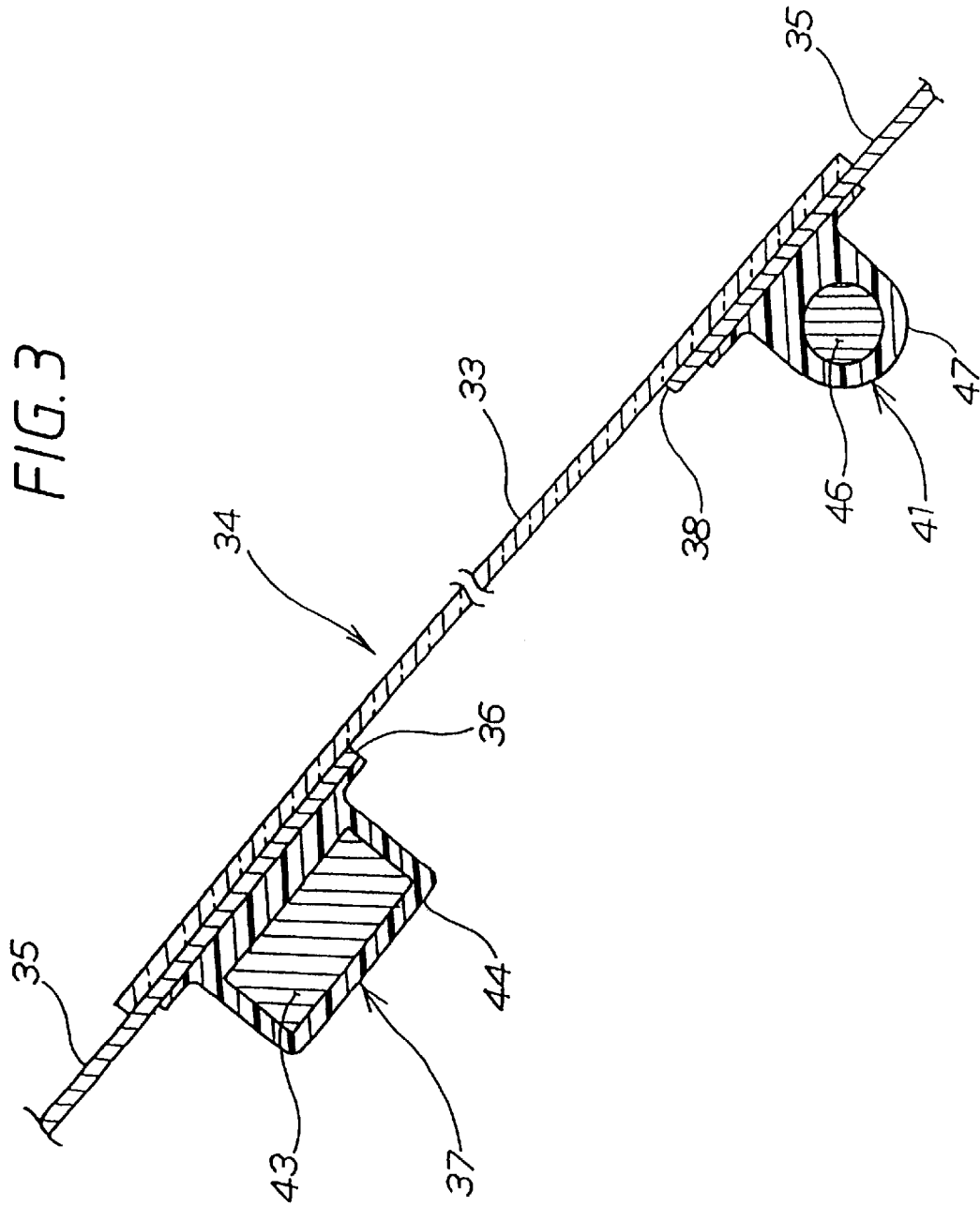
FIG. 3 is a cross-sectional view taken on the line III—III of FIG. 2.

FIG. 3 is a cross-sectional view taken on the line III—III of FIG. 2. The upper frame member 37 comprises a flexible frame main body 43 made of an fiberglass reinforced plastic (FRP), and a cover member 44 for covering the frame main body 43.

Moreover, the lower frame member 41 comprises a flexible frame main body 46 made of an FRP, and a cover member 47 for covering the frame main body 46.

Since the upper and lower frame main bodies 37, 41 are mounted on the rear side of the opaque surface material 35 so as not to be exposed to the outside through the rear window 33 nor project to the outer surface, the external appearance is not deteriorated.

The upper side 36 and the lower side 38 of the rear window 33 here denotes the upper and lower sides of the transparent part for viewing the outside from the car passenger compartment, that is, the rim part of the surface material 35. Moreover, the rear window 33 is mounted to the surface material 35 by adhesion or welding. Furthermore, since the rear part 34 is tensed when the hood 13 is in use (see FIG. 2), the rear window 33 elongates linearly to the positions of the upper and lower frame members 37, 41 in this cross-section.

Figure 4:
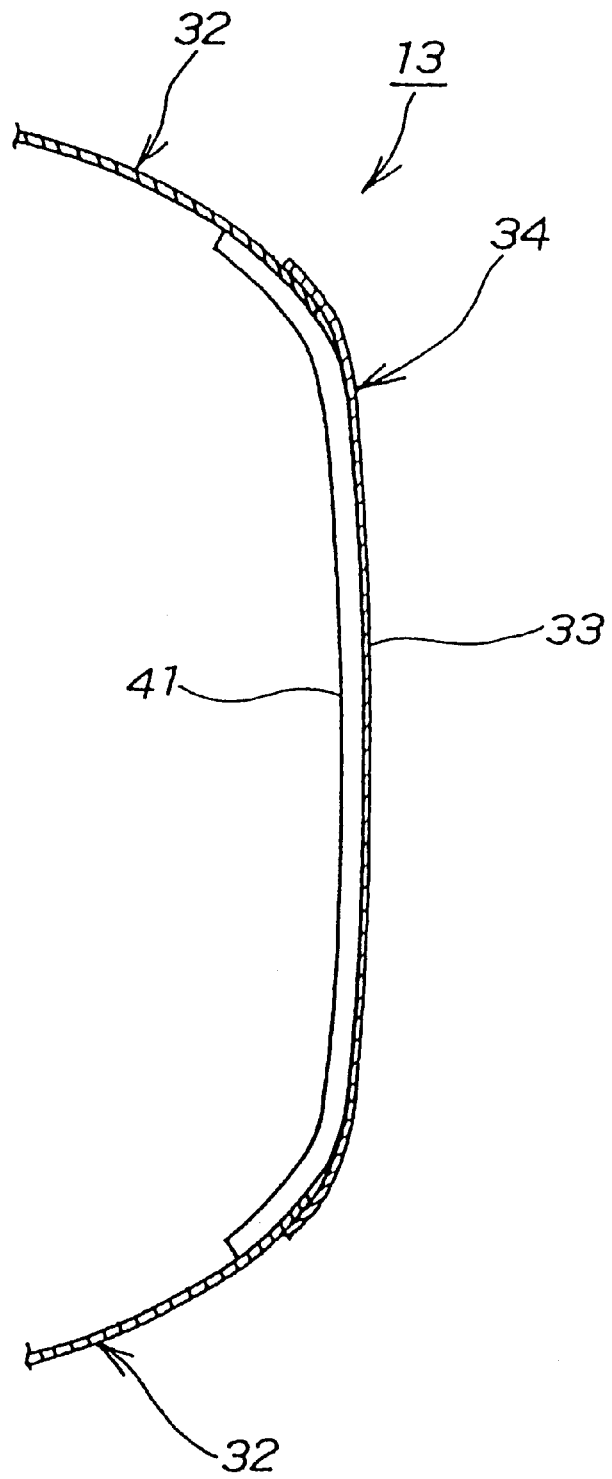
FIG. 4 is a cross-sectional view taken on the line IV—IV of FIG. 2.
Figure 7A:
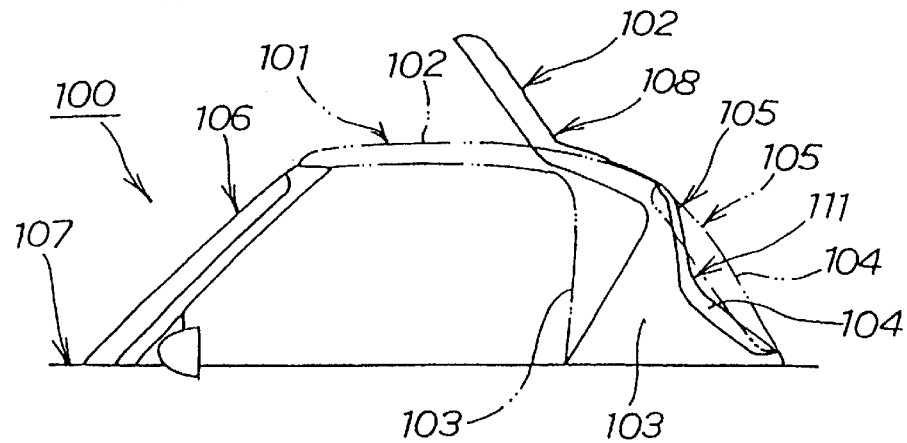
FIGS. 7A to 7C are diagrams for explaining the state of folding a conventional hood.
Figure 7B:
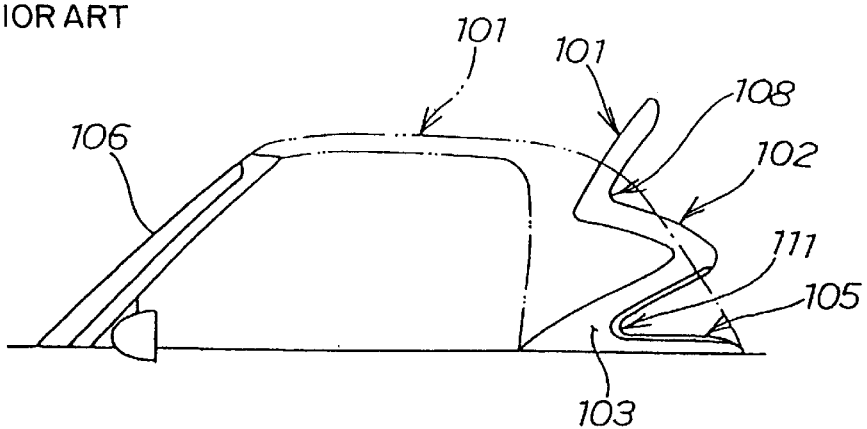
Figure 7C:
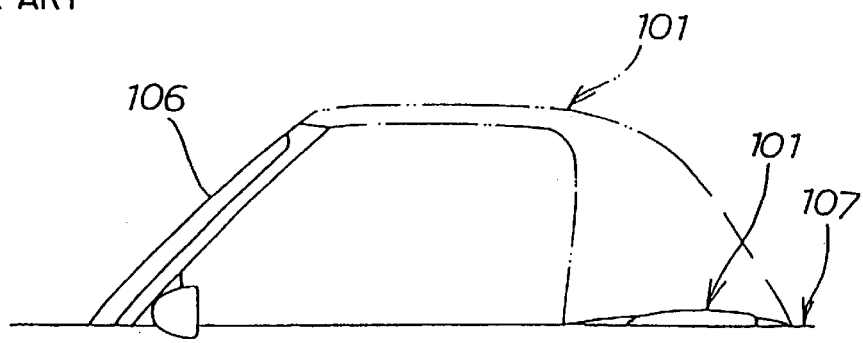
Figure 8:
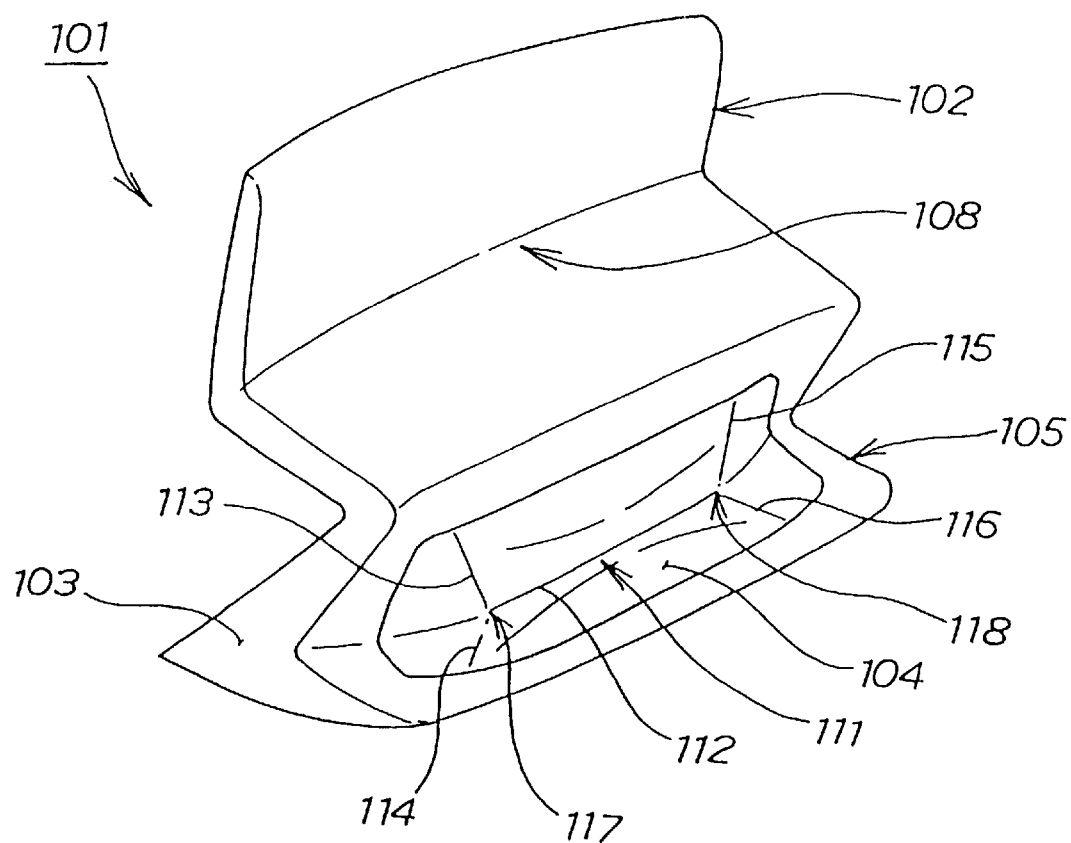
FIG. 8 is a perspective view of the conventional hood of FIG. 7B.

FIG. 4 is a cross-sectional view taken on the line IV—IV of FIG. 2. Since the lower end of the side parts 32, 32 and the rear part 34 of the hood 13 is mounted to the rear part of the car body 11 (see FIG. 1) in the curved projected state, when the hood 13 is set up, the hood 13 curves while projecting backward so as to have an arc-like shape in the car width direction over the side parts 32, 32 from the rear part 34. Therefore, the rear window 33 also curves while projecting backward so as to have an arc-like shape in the car width direction according to the rear part 34, and the upper frame member 37 (see FIG. 3) and the lower frame member 41 curve according to the rear part 34 as well.

The folding principle of the hood structure heretofore described will be explained.

FIGS. 5A and 5B are diagrams for explaining the folding operation of the rear window, with a simplified rear window shape for comparison of the state of folds produced at the time of folding, depending on the rear window shapes.

In FIG. 5A, in bending a flat plate 120 as the rear window bends vertically, a horizontal linear fold 121 is formed smoothly In FIG. 5B, in bending a curved plate 125 comprising a part of an upright cylinder 124 as the rear window (that is, two-dimensional curved window) bends vertically, a substantially horizontal linear fold 126 is formed as well as folds 131, 132 elongating from the end parts 127, 128 of the fold 126, folds 133, 134 elongating from the end part 127 to the substantially upper and lower directions, and folds 135, 136 elongating from the end part 128 to the substantially upper and lower directions, are formed.

Since the end parts 127, 128 are intersectional points of different surfaces so as to be a corner part, stress is concentrated thereto. The same can be applied to a three-dimensional curved window.

With reference to FIGS. 5A and 5B, stress can hardly be concentrated in the flat plate 120 in bending compared with the case of the curved plate 125.

Effects of the hood structure heretofore described will be explained.

FIGS. 6A and 6B are diagrams for explaining the effects of the hood structure according to the invention. FIG. 6A is a perspective view of the hood being folded, and FIG. 6B is a cross-sectional view taken on the line b—b of FIG. 6A.

In FIG. 6A, the ceiling part 31 is moved backward in the car for storing the hood 13, and bent at the upper bending part 48.

By moving the ceiling part 31, in FIG. 6B, tension in the side parts 32, 32 and the rear part 34 is eliminated. Accordingly, the upper frame member 37 regains the straight shape from the state of the imaginary line as shown by the arrow. Similarly, the lower frame member 41 (see FIG. 6A) regains the straight shape.

Therefore, the curvature of the rear window 33 in the car width direction, that is, in the direction of the elongation of the upper and lower frame members 37, 41 is eliminated.

In the case the folding operation of the hood 13 is repeated in the state, as shown in FIG. 6A, only the linear fold 49 elongating in the entire car width direction is formed in the rear window 33 without forming disadvantageous folds so that the rear window 33 can be folded smoothly. Therefore, permanent stretch is not generated at the fold 49 portion of the rear window 33, and thus the rear window 33 can be maintained in a flat state when the hood 13 is opened.

Although the flexible frames 37, 41 are provided at the upper and lower sides 36, 38 ends of the rear window 33 in the invention, they can be provided only at the upper side 36 end or the lower side 38 end.

Furthermore, the flexible frames 37, 41 can be mounted at the bending part of the surface material 35 (see FIG. 2).

Moreover, the two-dimensional curvature of the present invention refers to a shape comprising a part of a cylinder, with the arc direction corresponding to the car width direction.

According to the configuration, the invention has the following effects.

Since the rear window is a curved window, curved with an arc-like shape in the car width direction, with flexible frames disposed parallel along the upper side and the lower side of the curved window, mounted to the hood in the hood structure, the flexible frames regain the straight shape at the time of folding the rear window so as to eliminate the curvature of the rear window in the car width direction as well as a linear fold can be formed in this direction without forming disadvantageous folds.

Therefore, permanent stretch is not generated at the fold portion of the rear window, and thus the rear window can be maintained in a flat state when the hood is opened. While only certain embodiments of the invention have been specifically described herein, it will apparent that numerous modifications may be made thereto without departing from the spirit and scope of the invention.

What is claimed is:

1. A hood structure for a convertible car, comprising:
    a flexible hood;
    a resin rear window attached to said hood so as to be folded at the time of folding said hood, said rear window being a curved window having a substantially rectangular shape, curved with an arc shape in a car width direction; and
    a flexible frame mounted to said hood and disposed in a parallel manner along an upper side and a lower side of the curved window,
    wherein, when said hood is stretched, said flexible frame is curved to curve said rear window, and
    when said hood is folded, said flexible frame is returned to a straight shape so as to eliminate the curvature of said rear window.

2. A hood structure according to claim 1, wherein said hood includes an opaque surface material surrounding the circumference of said rear window, wherein said flexible frame is attached to said surface material in the vicinity of at least one of the upper side and the lower side of said rear window.

3. A foldable hood for a convertible car, comprising:

a resin rear window with a substantially rectangular shape, provided in a rear part of said hood so as to be folded at the time of folding said hood, said rear window being curved with an arc shape in a car width direction, when viewed from above; and a flexible frame mounted to said hood and disposed parallel with the car width direction, wherein, when said hood is stretched, said flexible frame is curved to curve said rear window, and when said hood is folded, said flexible frame is returned in a straight shape so as to eliminate the curvature of said rear window.

4. A flexible hood according to claim 3, further comprising:

an opaque surface material surrounding the circumference of said rear window, wherein said flexible frame is attached to said surface material in the vicinity of at least one of an upper side and a lower side of said rear window.

5. A foldable hood for a convertible car, comprising:

a resin rear window formed in a rear part of said hood so as to be folded at the time of folding said hood, said rear window being curved with an arc shape, when said hood is stretched; and a flexible frame attached to said hood, wherein, when said hood is stretched, said flexible frame is curved to curve said rear window, and when said hood is folded, said flexible frame is straightly extended in a car width direction so as to eliminate the curvature of said rear window.

6. A foldable hood according to claim 5, wherein said flexible frame is attached to said hood in the vicinity of at least one of an upper side and a lower side of said rear window.

7. A foldable hood according to claim 5, wherein said rear window has a substantially rectangular shape.

* * * * *